J. RICHER & C. O. SWENSON.
OIL TRANSMISSION MECHANISM.
APPLICATION FILED OCT. 4, 1915.

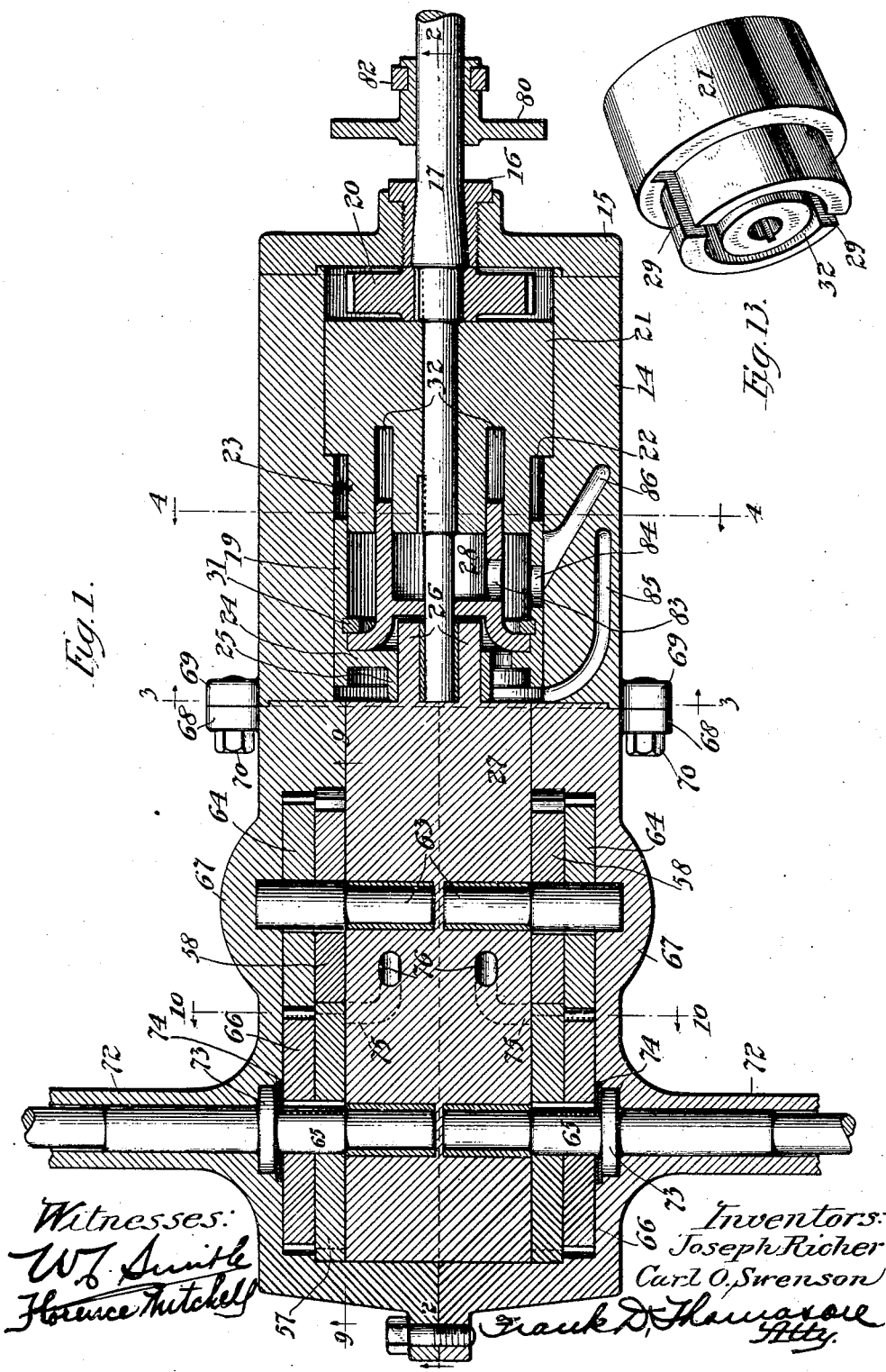

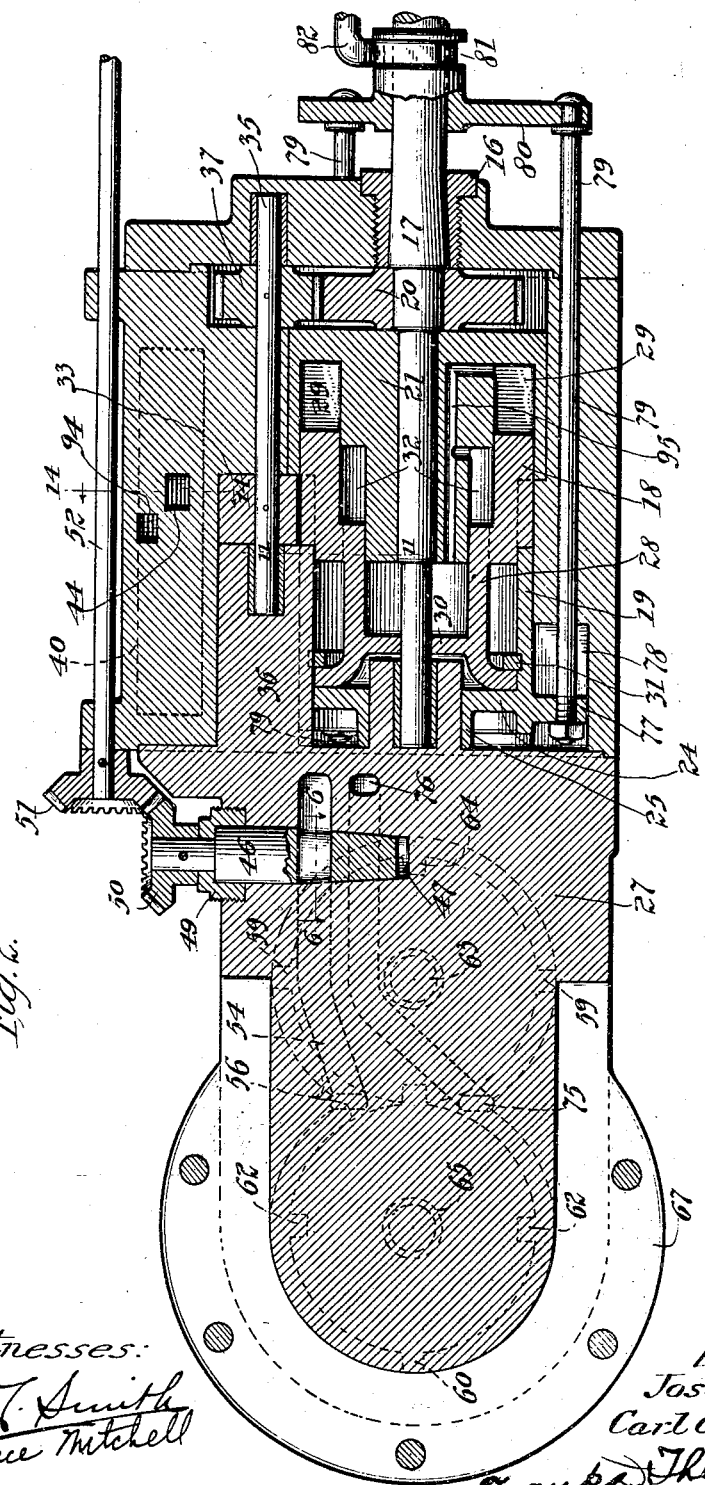

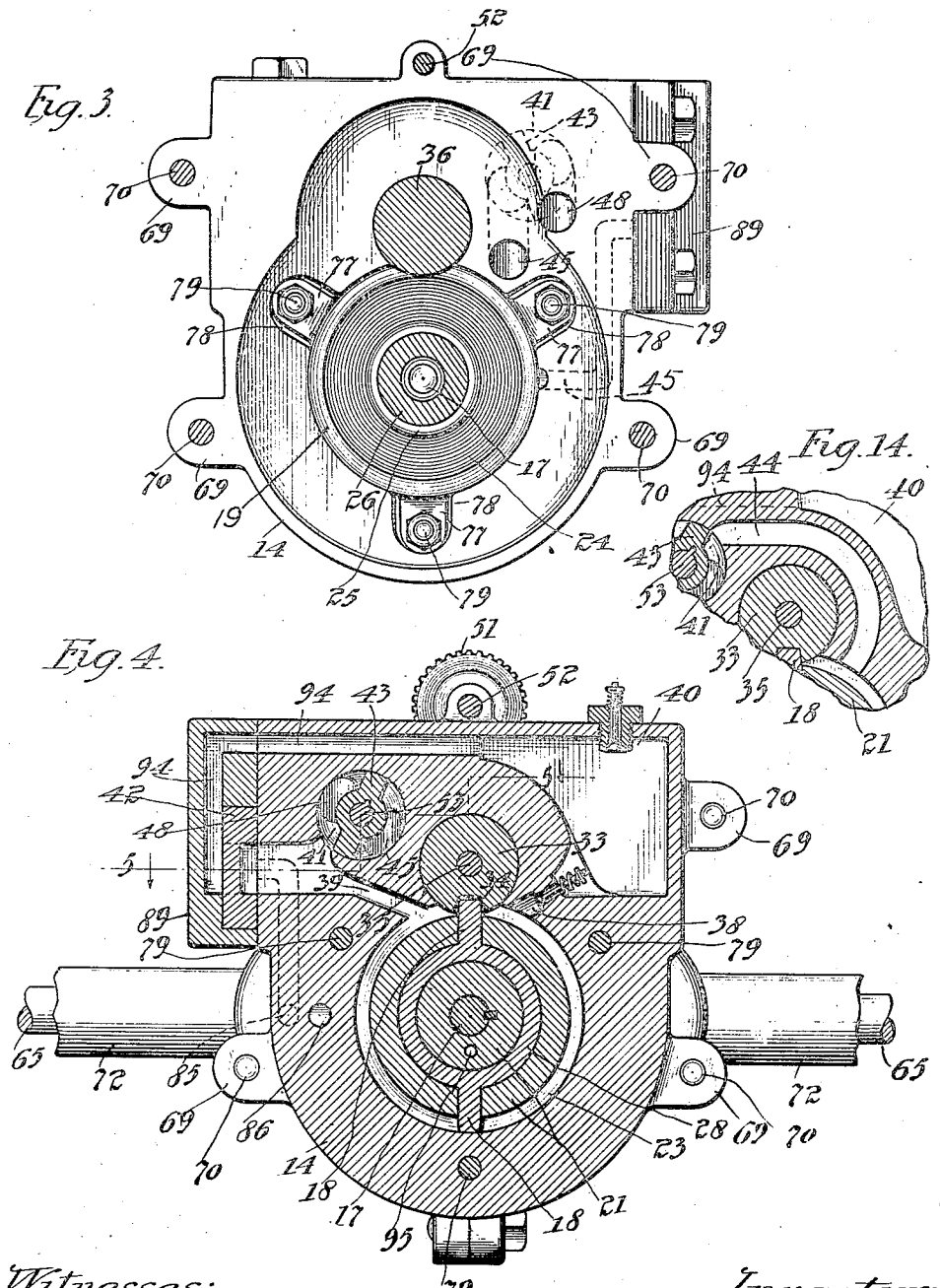

1,246,322.

Patented Nov. 13, 1917.
5 SHEETS—SHEET 4.

Witnesses:

Inventors:
Joseph Richer
Carl O. Swenson

J. RICHER & C. O. SWENSON.
OIL TRANSMISSION MECHANISM.
APPLICATION FILED OCT. 4, 1915.

1,246,322.

Patented Nov. 13, 1917.
5 SHEETS—SHEET 5.

Witnesses:
W. T. Smith
Florence Mitchell

Inventors.
Joseph Richer
Carl O. Swenson
by Frank N. Thompson
Atty.

UNITED STATES PATENT OFFICE.

JOSEPH RICHER AND CARL O. SWENSON, OF CHICAGO, ILLINOIS.

OIL TRANSMISSION MECHANISM.

1,246,322.  Specification of Letters Patent.  Patented Nov. 13, 1917.

Application filed October 4, 1915. Serial No. 53,909.

*To all whom it may concern:*

Be it known that we, JOSEPH RICHER and CARL O. SWENSON, subjects of the King of Sweden, (having declared their intentions of becoming citizens of the United States,) residing at Chicago, in the county of Cook and State of Illinois, have invented new and useful Improvements in Oil Transmission Mechanism, of which the following is a full, clear, and exact description.

Our invention relates to mechanism for the transmission of the motion of the drive-gear of an engine to the driven mechanism of the machine actuated thereby.

The object of our invention is to transmit the motion of the drive-shaft of an engine to the mechanism driven thereby by means of a suitable fluid, and more particularly for the purpose of transmitting the motion of the engine of a motor car to the axles of the drive wheels thereof. It is also the object of our invention to regulate the speed of said axles by controlling the moving volume of fluid coursing through the same, to automatically regulate the speed of said axles so that any difference in the travel of the wheels on said axles will be equalized, and to automatically control the speeds of the inner and outer driven axles of a motor car when turning a curve or departing from a perfectly straight course so that the wheel describing the outer segment of the curve will travel proportionately faster than the inner wheel. This we accomplish by the means hereinafter described, and as particularly pointed out in the claims.

In the drawings:

Figure 1 is a horizontal central section of our improved fluid transmission mechanism.
Fig. 2 is a vertical central section therethrough.

Fig. 3 is a transverse section taken on dotted line 3—3, Fig. 1.

Fig. 4 is a similar section taken on dotted line 4—4, Fig. 1.

Figure 9:
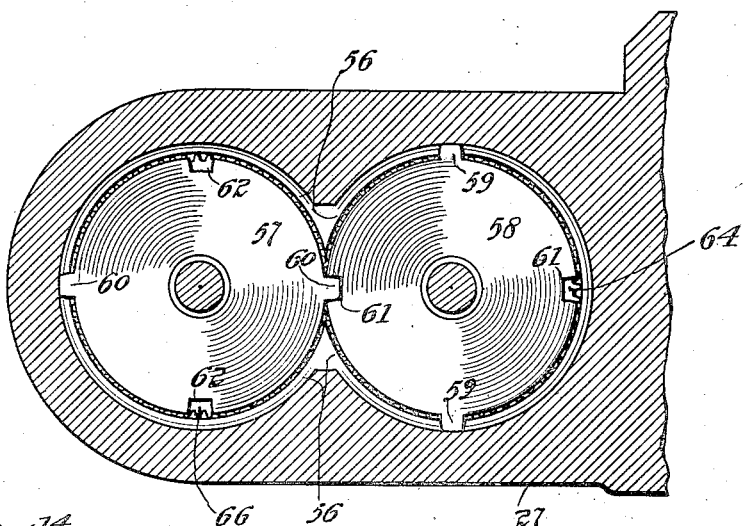

Fig. 9 is a vertical longitudinal section taken on dotted line 9—9, Fig. 1.

Figure 10:
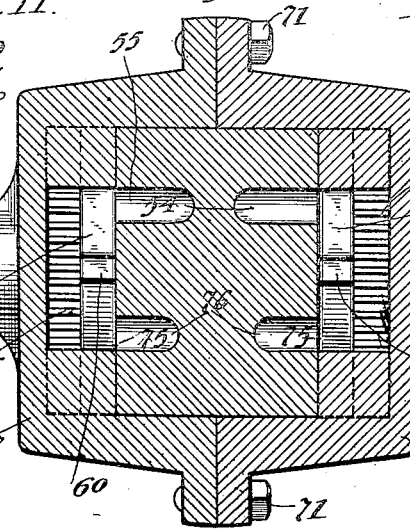

Fig. 10 is a transverse section taken on dotted line 10—10, Fig. 1.

Figure 11:
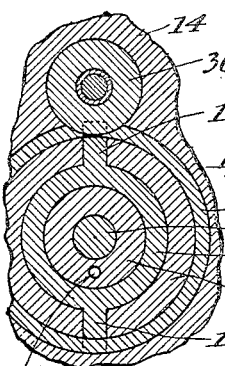

Fig. 11 is a transverse section of a fragment of the same taken on dotted line 11—11, Fig. 2.

Figure 12:
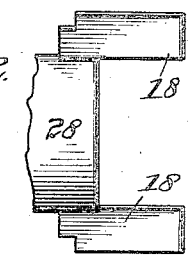

Fig. 12 is a side view of a broken away end of a vane regulator.

Fig. 13 is a detail view showing the solid rotary pump section in perspective.

Fig. 14 is a transverse section of a fragment of our invention taken on dotted line 14—14, Fig. 2.

Our invention includes a pumping mechanism and a rotor mechanism which is actuated by the fluid expelled therefrom.

Referring to the drawings, 14 represents a metal casing which is suitably cored out from end to end, as will hereinafter be more fully set forth, and has comparatively thick walls. One end of this casing is closed by a suitable metal head 15, which has suitable bearings 16 screwed into the same in alinement with the axis of the cored out portion of the casing in which a suitable drive-shaft 17 is journaled. Immediately next the inside of this head 15 said drive-shaft 17 has a gear 20 mounted thereon, and immediately next this gear the pump is mounted thereon. This pump consists of a solid section 21, which is unmovably mounted on and revolves with shaft 17, and a tubular section 28 that is slidably mounted on and revolves with said shaft. Solid section 21 is located next gear 20 and it extends therefrom past the center of length of the casing. The portion of this section next said gear is greater in diameter than the opposite end and provides a circumferential shoulder 22, and this wider portion engages and revolves in contact with the circumference of the bore of the casing, which latter is reduced in diameter in the transverse plane of shoulder 22 to the opposite end of the casing. The diameter of the reduced bore of the casing is greater, however, than the diameter of the reduced portion of said section 21, thus leaving an annular chamber 23 between the outer circumference of the reduced portion of the rotor and the inner circumference of the bore of the casing in which the vanes 18 of said pump revolve, one side of which is defined by shoulder 22 and the opposite side by the annular edge of the adjacent end of a non-rotatable cylinder 19, whose annular edges overlap the reduced end of section 21. Cylinder 19 is of such length that it occupies substantially all of the portion of the reduced bore of the casing not occupied by pump-section 21, and its end farthest from said section is closed by a head 24, which latter has a flanged boss 25 that is mounted upon and has sliding engagement with cylindrical bearing 26 in which the adjacent end of drive-shaft 17 is journaled. This bearing 26 projects axially and is made integral with a filler-block 27 closing the adjacent end of the bore casing 14, and extends in alinement therewith a suitable distance beyond the transverse axes of the driving-axles of the car, as will hereinafter be more fully specified.

The vanes 18 consist of two rectangular blades that are arranged diametrically opposite each other and are secured edgewise at one end to the tubular pump section 28, substantially as shown in Fig. 12 of the drawings. These vanes have the outer corners of the ends that are attached to section 28 recessed so as to accommodate the edge of cylinder 19, and their opposite ends nearest head 15 extend into and are adapted to enter and have reciprocable play in pockets 29 made longitudinally in pump-section 21, substantially as shown in Fig. 2 of the drawings. Pump section 28 has its end farthest from pump section 21 closed with a web that is slidably mounted upon shaft 17, but revoluble therewith, and it is provided with an outwardly flaring circular end edge that extends beyond its closed end and engages the inner circumference of cylinder 19 and is retained by a suitable packing-ring 31 seated in said inner circumference. Cylinder 19 and the tubular pump section 28 are movable simultaneously toward or from the solid pump section 21, and when said cylinder and tubular section move toward section 21 the annular chamber 23 is made narrower and the area of the exposed portion of the vane in said chamber 23 is correspondingly decreased as the vanes enter pockets 29 and the edges of section 28, to which the vanes are attached, enter a circular groove 32 made in the end of section 21.

When pump sections 21 and 28 revolve the vanes revolve and push the fluid in chamber 23 before them, and in order to prevent the continuous circulation of the fluid in this chamber and to expel the same therefrom into passages leading to the rotors the uppermost segment of the reduced portion of the rotor is engaged by an abutment-roller 33 the axis of which is parallel to the axis of shaft 17. The diameter of this roller is just one-half the diameter of said section 21 and is provided with a transverse recess 34 in its circumference which is engaged by vanes 18 once during every revolution thereof. This roller is secured to a longitudinal shaft 35 that is parallel to shaft 17 and its ends are journaled in head 15 and in suitable bearings made in the adjacent end of a cylindrical extension 36, which latter is made integral with and extends longitudinally from filler-block 27, and this shaft 35 is driven through the medium of a pinion 37 secured thereto next head 15 by gear 20. On one side of the vertical line intersecting the axes of shafts 17 and 35, annular chamber 23 is connected by means of an inlet-passage 44 to one side of a valve chamber 41, and on the other side of the point of engagement of pump-section 21 and roller said annular chamber has a discharge-passage 39.

Passage 39 leads to and terminates in an enlargement thereof, and this enlargement has a port discharging into valve-chamber 41 diametrically opposite the mouth of passage 44, the axis of which latter extends longitudinally. At the side of the casing this enlargement has a port that communicates with the central recess of a sliding-valve 88, which will hereinafter be more fully described. The valve 43 in valve-chamber 41 is of the butterfly type, that is, it has a central boss from which corresponding thick wings project diametrically opposite each other and engage the circumferential walls of the valve-chamber. The inlet-port from passage 39 into this chamber strikes through the circumferential wall thereof, and when said valve 43 is rocked to the limit of its movement in one direction it will direct the fluid from passage 39 into a passage 48 leading from the end of said valve-chamber through the walls of the casing and into filler-casting 27 to the rotors in the same and will direct the fluid returning to the valve-chamber through a passage 45 into the same end that passage 48 leads from, into passage 44, and from thence into annular-chamber 23 on the side of roller 33 opposite passage 39. If valve 43 is moved to its opposite limit then the fluid would flow from passage 39 into the valve-chamber 41 and from thence into passage 45 to the rotors and would return through passage 48 to the valve-chamber and then through passage 44 to annular chamber 23. Passage 48 leads through the walls of the casing and the filler-casting to a vertically disposed plug-valve 46 seated in a vertical valve-seat 47 situated in the center of width of said casting 27 adjacent casing 14. When the fluid is forced through passage 48, the rotors are revolved so as to propel the car forward; when the fluid is forced through passage 45 the rotors are reversed or revolved in the opposite direction and the car is propelled backward.

The upper portion of valve 46 is reduced in diameter and is retained in position by a nut 49 screwed into the countersunk upper end of valve-seat 47, and this reduced upper end extends above said nut 49 and has a miter-gear 50 secured thereto that is engaged by a similar miter 51 on the adjacent end of a longitudinal shaft 52, which latter is journaled in suitable bearings on top of casing 14 and extends forward and is connected to the steering-gear (not shown) and rocked thereby.

Valve 43 is mounted upon a rock-shaft 53 and this shaft 53 is journaled in the walls of the casing and extends longitudinally out through head 15 where it can be manipulated by any suitable means according to the desire of the operator either to revolve the axles in one direction or the other.

Valve 46 in the horizontal plane of passage 48 is provided with a transaxial opening therethrough and the valve-seat opposite passage 48 has two passages 54 and 55 leading longitudinally therefrom, and adjacent to said valve seat, the ends of these passages converge toward each other. At a suitable point to the rear of valve 46 these passages 54 and 55 are bent laterally in opposite directions and extend to the rotor-chambers 56 located on either side of the filler-casting 27 into which they discharge, midway the length of said chambers above the point of contact of rotors 57 and 58.

These rotors comprise corresponding circular disks each of which at points diametrically opposite each other is provided with a piston 59, 59, and 60, 60, respectively consisting of outwardly projecting cog-shaped members which, as said rotors revolve, come in contact with the peripheral walls of the rotor chambers, except between the truncated points where said walls meet and are intersected by the transverse vertical plane located midway the axes of said rotors. Midway between pistons 59, 59, and 60, 60, the rotors have recesses 61, 61, and 62, 62, respectively, in their peripheries, and said rotors are so placed that their peripheries come in contact and the pistons and recesses of the one are so disposed that they engage the recesses and piston of the other as they revolve. Rotors 58, 58, are mounted on transverse spindles 63, the inner reduced ends of which are journaled in alining bearings in filler-casting 27, and immediately next the outer side of the rotors these spindles have gears 64, 64, securely mounted thereon. Rotors 57, 57, are securely mounted upon the inner portions of the axles 65, immediately next and alongside of filler-casting 27, and the inner reduced ends of these axles are journaled in said filler-casting in a manner similar to the inner ends of spindles 63. Immediately next the outer side of rotors 57 gears 66 are securely mounted on axles 65, and correspond in diameter with and engage gears 64. The rotor chambers 56 are made in the recessed inner side of cast metal side frames 67 that are of such shape that they inclose the top, bottom and rear end of the filler-casting and their forward ends are provided with lugs 68 that are suitably bolted to corresponding lugs 69 projecting from the adjacent end of casing 14 by bolts 70, and their longitudinal edges meet in a vertical longitudinal plane midway between the edges of the filler-casting are flanged outward and are connected by bolts 71 at suitable points along their lengths. These flanges are provided with bearings for the outer ends of spindles 63, and are also provided with laterally projecting bearing stubs 72 for the outer extensions of axles 65, and these axles, immediately next the rotor chambers, are provided with circumferential flanges 73, and between said chambers and these flanges suitable packing-rings 74 are placed upon the axles and compressed between gears 66 and said flanges to prevent leakage of the fluid from said rotor chambers.

The transmission fluid, preferably oil, fills all of the chambers, passages and other unoccupied spaces within casing 14, the filler-casting and side-frames thereof, and when this oil is pumped from the rotary pump within casing 14 it is forced through passage 48 through the transaxial opening in valve 46 and through passages 54 and 55 into the center of length of the rotor chamber above the point of contact of the two rotors, and the pressure thereof engages the sides of the pistons of the rotors and revolves them in opposite directions at the same speed. The fluid travels almost entirely around the rotors and is discharged through ports 75 leading from the rotor chambers into filler-casting 27, at points below the point of contact of the rotors, substantially as shown in Figs. 1, 2 and 10 of the drawings. These discharge ports lead into passages 76 which extend upward and then longitudinally to the rear and discharge into passage 45, which latter directs the returning fluid into valve-seat 41 of valve 43 and from thence through passage 44 into annular chamber 23 of the pump again.

Figure 5:
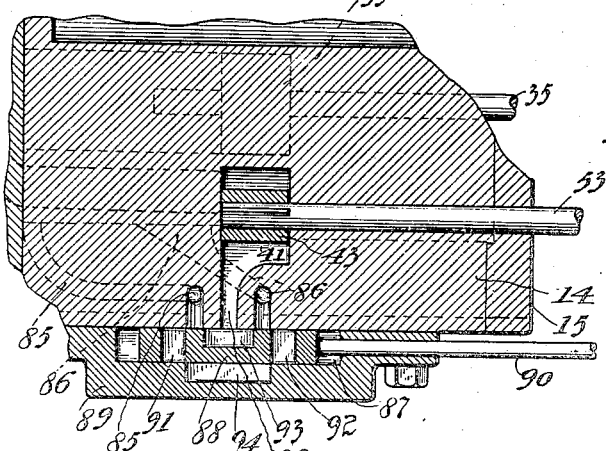
Fig. 5 is a transverse horizontal section of a part of said mechanism taken on dotted line 5—5, Fig. 4.
Figure 6:
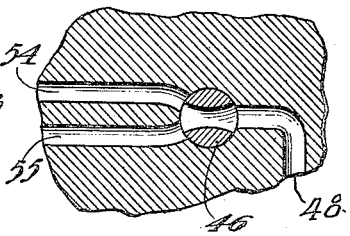
Fig. 6 is a horizontal section of a fragment of the same taken on dotted line 6—6, Fig. 2.
Figure 7:
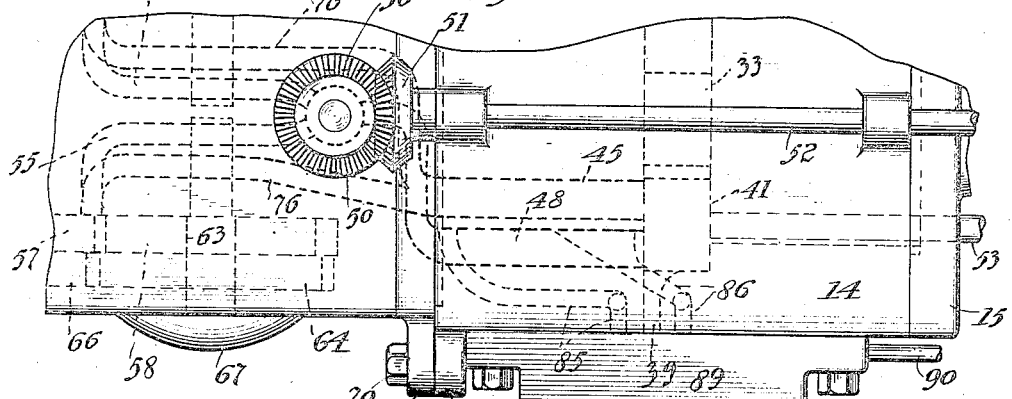
Fig. 7 is a plan view of a portion thereof.
Figure 8:
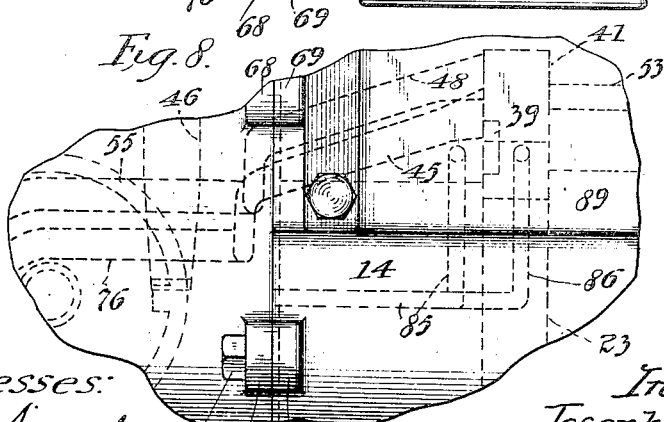
Fig. 8 is a side elevation of a fragment of said improved mechanism.

In order to increase or decrease the speed of the rotors the width of the annular chamber 23 is increased or decreased and the area of the exposed surfaces of the vanes in said annular passage is correspondingly increased or decreased, in the manner hereinbefore explained, by telescoping the cylinder 19 and the tubular section 28 of the pump over and into the solid pump section. This can be done by connecting lugs 77, projecting outward from the end of cylinder 19 farthest from pump section 21, into longitudinally elongated recesses 78 in the annular walls of the bore of casing 14, by longitudinally disposed rods 79, which latter extend through the walls of the casing and head 15 and have their forward ends connected to a cross-bar 80. This bar 80 has a boss that is loosely and slidably mounted on the drive-shaft, and this boss has a circumferential groove 81 that is engaged by the bifurcated end of a lever 82, operated through the medium of mechanism (not shown) by the operator. We prefer, however, to shift cylinder 19, and the tubular pump section by the pressure of the fluid exerted on one side or the other of the closed ends thereof. This we accomplish by perforations 83 and 84 in the cylindrical walls of the tubular pump section 28 and cylinder 19, respectively, and by passages 85 and 86, the former of which leads to parts that communicate, as shown in Fig. 5 of the drawings, to the valve-chamber 87 of an oblong sliding-valve 88. The housing 89 for this valve-chamber is secured to the side of casing 14, and the valve is reciprocated by a rod 90 that extends longitudinally forward through suitable bearings in the forward end of the said housing and is manipulated by any suitable means controlled by the operator. Midway between the ports of passages 85 and 86 the induction port of passage 39 communicates with the valve-chamber 87, and the central portion of the valve 88, (which is constructed substantially similar to the ordinary locomotive cylinder slide-valve) is recessed on the side thereof next the casing for a distance corresponding to the distance between the ports of passages 85 and 86 to form a by-pass 93. Valve 88 is also provided with corresponding transverse ports 91 and 92 between by-pass 93 and the ends of the valve that are separated such a distance from the by-pass that when the valve is in the central position, shown in Fig. 5 of the drawings, the intervening solid part of the valve will close both ports of passages 85 and 86. On the side of the valve opposite the by-pass the housing has a vertical passage 94 which is of a width corresponding to the distance between ports 91 and 92, and extends from the horizontal plane of the lower side of the by-pass, substantially as shown in Fig. 4 of the drawings, through the walls of the housing above valve 88 near to the upper end of said housing, and then turns laterally through casing 14 to and terminates in reservoir 40.

Now, when valve 88 is moved from its central position toward the front end of casing 14, passage 86 will communicate through the medium of by-pass 93 with passage 39, and passage 85 will communicate through the medium of port 91 with passage 94, and the fluid pressure from passage 39 will be forced through passage 86 in front of cylinder 19 and between the same and pump 21 and cause said cylinder 19 and tubular section 28 to move toward filler casting 27 and increase the volume of fluid pumped by vanes 18 to the rotor chambers and thus cause the latter to revolve faster, and at the same time the fluid between said filler casting 27 and pump section 28 will exhaust therefrom through passage 85 and through port 91 into passage 94 to the reservoir. When valve 88 is moved past the center of the valve-chamber toward the rear limit of movement thereof, the fluid pressure from passage 39 will flow into passage 85 and from thence into space between said cylinder 19 and filler casting 27, and will move the cylinder and tubular pump section toward the solid pump section and will narrow the annular passage 23, and vanes 18 will send a smaller volume of fluid into the rotor-chambers and cause said rotors to travel slower.

When the vanes enter pockets 29 of the solid pump section and the annular walls of the tubular pump section enter the circumferential groove 32 therein the fluid will be forced out of said pockets and out of said groove through a longitudinal duct 95 into the bore of said tubular pump section and mingle with the fluid that escapes therefrom through passage 86 and port 92 and passage 94 to reservoir 40, and when said vanes and annular wall of said tubular section are withdrawn from pump section 21 by the pressure from chamber 39 the fluid will fill out said pockets and groove.

What we claim as new is:

1. Fluid transmission mechanism comprising a drive-shaft, a rotary pump composed of a pair of concentric sections mounted on the drive shaft, integral vanes radiating therefrom, rotors, shafts upon which said rotors are mounted the axes of which are transverse to the axis of said drive-shaft, a casing inclosing said pump and rotors having passages from the annular chamber in which said vanes revolve to said rotor chambers and from said rotor chambers to said annular chamber, and an abutting member engaging the periphery of said pump between the inlet and outlet of said annular chamber.

2. Fluid transmission mechanism comprising a drive-shaft, a rotary pump comprising a pair of concentric sections, integral vanes radiating therefrom, rotors, shafts upon which said rotors are mounted the axes of which are transverse to the axis of said drive-shaft, a casing inclosing said pump and rotors having valve-controlled passages from the annular chamber in which said vanes revolve to said rotor chambers and from said rotor chambers to said annular chamber, and an abutting member engaging the periphery of said pump between the inlet and outlet of said annular chamber.

3. Fluid transmission mechanism comprising a drive-shaft, a rotary pump having a pair of concentric sections, integral vanishing vanes radiating from one of said sections, rotors, shafts upon which said rotors are mounted the axes of which are transverse to the axis of said drive-shaft, a casing inclosing said pump and rotors having an annular chamber in which said vanes revolve, and passages connecting said annular chamber and rotor chambers, and an abutting member engaging the periphery of said pump between the inlet and outlet of said annular chamber.

4. Fluid transmission mechanism comprising a drive-shaft, a rotary pump, vanishing vanes concentric with the drive-shaft and movable longitudinally thereto radiating therefrom, rotors, shafts upon which said rotors are mounted the axes of which are transverse to the axis of said drive-shaft, a casing inclosing said pump and rotors having an annular chamber in which said vanes revolve the width of which is adapted to vary to correspond to the exposed area of the vanes, and passages connecting said annular chamber and rotor chambers, and an abutting member engaging the periphery of said pump between the inlet and outlet of said annular chamber.

5. Fluid transmission mechanism comprising a longitudinal drive-shaft, a rotary pump, vanes radiating therefrom, two disconnected rotors, transverse shafts upon which said rotors are mounted, a casing inclosing said pump and rotors having an annular chamber in which said vanes revolve, separate passages one leading to one rotor chamber and the other to the other rotor chambers and which merge into and are connected by a single passage with said annular chamber, and passages leading from said rotor chambers that merge into and discharge through a single passage into said annular chamber, and a two-way valve at the confluence of the passages leading to the rotor chambers.

6. Fluid transmission mechanism comprising a casing, rotors whose axes are transverse and which revolve in suitable chambers in said casing, a longitudinal drive-shaft journaled in said casing, a rotary pump consisting of a solid section secured to said drive-shaft and a tubular section reciprocable to and from said solid section, radial vanes mounted on said tubular section revoluble in an annular chamber in said casing, and means for moving said tubular section to and from said solid section.

7. Fluid transmission mechanism comprising a casing, rotors in said casing whose axes are transverse, a longitudinal drive-shaft journaled in said casing, a pump which transmits fluid to and receives fluid from the chambers in which said rotors revolve and which consists of a solid member secured to said drive-shaft, and a tubular member slidably concentric to said shaft, vanes carried by said tubular member that move in an annular chamber in said casing, and mechanism for moving said tubular pump section to and from said solid member.

8. Fluid transmission mechanism comprising a casing, rotors in said casing whose axes are transverse, a longitudinal drive-shaft journaled in said casing a pump which transmits fluid to and receives fluid from the chambers in which said rotors revolve and which consists of a solid member secured to said drive-shaft, and a tubular member slidably concentric to said shaft, a cylinder to which said tubular section is connected, vanes carried by said tubular member that move in an annular chamber in said casing, and mechanism for moving said tubular pump and cylinder section to and from said solid member.

9. Fluid transmission mechanism comprising a casing, a rotor revoluble in a chamber therein, a drive-shaft, a rotary pump mounted on the drive shaft which consists of a pair of concentric portions one of which has integral vanes revoluble in a chamber therein, which latter is connected by a discharge and intake passage with said rotor chamber, and means for regulating the volume of fluid forced by said rotary pump to said rotor chamber.

10. Fluid transmission mechanism comprising a casing, a circumferentially engaged rotor revoluble in a chamber therein, a drive-shaft, a rotary pump mounted on the drive shaft which consists of a pair of concentric portions one of which has integral vanes revoluble in a chamber therein which latter is connected by a discharge and intake passage with said rotor chamber, and means for regulating the volume of fluid forced by said rotary pump to said rotor-chamber.

11. Fluid transmission mechanism comprising a casing, a rotor revoluble in a chamber therein, a rotary pump in a chamber in said casing and comprising two sections, one fixed upon its axis and the other rotatable with but slidable on its alining axis, vanes carried by the slidable section which are adapted to enter pockets in said fixed section, means for adjusting the width of the annular portion of the chamber in which said pump vanes revolve, and a discharge passage and an intake passage connecting said chambers.

12. Fluid transmission mechanism comprising a casing, a rotor revoluble in a chamber therein, a rotary pump in a chamber in said casing and comprising two sections, one a solid section immovable longitudinally upon its axis, and the other rotatable with but slidable on its alining axis and tubular at the end thereof adjacent said solid section and provided with vanes which, together with the tubular portion of said slidable section are adapted to enter pockets in said solid section and a concentric annular groove in the opposing end of said longitudinally immovable section, means for adjusting the width of the annular portion of the chamber in which said pump vanes revolve, and a discharge passage and an intake passage connecting said chambers.

13. In a fluid transmission mechanism, a rotary pump comprising a casing having a circular chamber therein having intake and discharge passages, and having a portion thereof greater in diameter than its remainder, a drive-shaft journaled in the ends of said chamber which is stepped in diameter, and a rotary pump having a solid section immovable longitudinally on said drive-shaft, the larger portion snugly occupying and revoluble in the wider portion of said chamber and the reduced portion being less in diameter than and revolving the narrower portion of said chamber, and said pump having a tubular section and concentric thereto but outside thereof, a cylinder slidable concentric to said shaft, and vanes carried by said tubular section which, when said tubular section enters an annular groove in the end of said solid section and said cylinder telescopes over the end thereof, enter pockets in said solid section.

14. In a fluid transmission mechanism, a casing having a pump chamber that has an intake passage and a discharge passage leading therefrom, a rotary pump consisting of a longitudinally immovable section and a slidable section in axial alinement with each other, vanes carried by said slidable section and adapted to enter pockets in said fixed section and to move in an annular chamber of an adjustable width, and a valve the chamber in which it moves being connected with said annular chamber by a passage, and connected to the spaces in front of and to the rear of said slidable section by passages and to a reservoir in said casing by another passage.

15. In a fluid transmission mechanism, a casing, a rotary pump within said casing consisting of a solid longitudinally immovable section, and a slidable section the axes of which aline, a sliding valve and passages which when moved in one direction causes said slidable pump section to move toward said longitudinally immovable rotatable section and when moved in the opposite direction causes the slidable section to move away from said fixed section.

16. In a fluid transmission mechanism, a casing, a chamber therein, a pump revoluble in said chamber consisting of a longitudinally immovable section and a slidable section the axes of which aline, a sliding valve and passages which when moved in one direction causes said slidable section to move toward said fixed section and when moved in the opposite direction causes said slidable section to move away from said fixed section, a rotor the chamber in which it revolves being connected to said pump chamber by an intake and a discharge passage, and a valve the chamber of which intersects said passage and reverses the flow of fluid therethrough.

17. A rotary pump comprising in combination, a drive-shaft, members rotatable concentric with the drive-shaft one of said members having integral vanes, a chamber in which said members rotate having an intake and a discharge passage, and means whereby said pump may discharge a variable volume of fluid from the chamber without changing the speed of the drive shaft.

18. A rotary pump comprising in combination, a drive-shaft, members rotatable concentric with the drive-shaft one of said members having integral vanes and being movable longitudinally thereof, a chamber in which said members rotate having an intake and discharge passage, ports in said pump members, means coöperating with said ports to shift said members, said pump members being arranged to permit a variable volume of fluid to be discharged from the chamber without changing the speed of the drive-shaft.

19. A rotary pump comprising in combination, a drive-shaft, members rotatable concentric with the drive-shaft, one of said members having integral vanes and being movable longitudinally of the drive-shaft, a chamber in which said members rotate having an intake and a discharge passage, said pump members forming a means whereby a variable volume of fluid may be discharged from the chamber without changing the speed of the drive-shaft.

In witness whereof we have hereunto set our hands and seals this 30th day of September, 1915.

JOSEPH RICHER.
CARL O. SWENSON.

Witnesses:
FRANK D. THOMASON,
FLORENCE MITCHELL.